United States Patent
Yuan (10) Patent No.: US 8,070,632 B2
(45) Date of Patent: Dec. 6, 2011

(54) TORSIONAL COMPENSATOR

(75) Inventor: Jing Yuan, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 294 days.

(21) Appl. No.: 12/475,496

(22) Filed: May 30, 2009

(65) Prior Publication Data

US 2010/0304907 A1    Dec. 2, 2010

(51) Int. Cl.
*F16H 55/14* (2006.01)

(52) U.S. Cl. .............. 474/94; 474/161; 464/89; 74/411; 74/443

(58) Field of Classification Search .......... 474/94, 474/161; 464/75, 89–91; 74/411, 443, 446, 74/447, 448, 451
See application file for complete search history.

(56) References Cited

U.S. PATENT DOCUMENTS

| | | | |
|---|---|---|---|
| 2,765,759 A | 10/1956 | Attwood et al. | |
| 3,101,214 A * | 8/1963 | Talboys | 295/1 |
| 4,328,879 A | 5/1982 | Tone | |
| 4,486,183 A | 12/1984 | Posiviata et al. | |
| 4,496,332 A | 1/1985 | Keller et al. | |
| 4,850,244 A | 7/1989 | Eckel et al. | |
| 5,591,093 A * | 1/1997 | Asai et al. | 474/94 |
| 5,884,893 A | 3/1999 | Seki et al. | |
| 5,931,052 A | 8/1999 | Zhao et al. | |
| 6,688,986 B2 | 2/2004 | Hojyo et al. | |
| 7,143,734 B1 | 12/2006 | Leppanen et al. | |
| 2007/0209899 A1 | 9/2007 | Liu et al. | |
| 2009/0005181 A1 | 1/2009 | Monis et al. | |

* cited by examiner

*Primary Examiner* — William E Dondero (74) *Attorney, Agent, or Firm* — P. N. Dunlap, Esq.; J. A. Thurnau, Esq.; T. A. Dougherty, Esq.

(57) ABSTRACT

A torsional compensator having an inner hub, an outer sprocket, left and right grippers, and a resilient torsion sleeve. The torsion sleeve occupies a generally annular cavity between the inner hub and outer sprocket and each end of the sleeve is coupled to a gripper. One gripper is coupled to the inside of the outer sprocket and the other gripper is coupled to the outside of the inner hub and they are axially spaced apart. The inner hub supports the outer sprocket for coaxial rotation thereon.

26 Claims, 5 Drawing Sheets

TORSIONAL COMPENSATOR

BACKGROUND OF THE INVENTION

1. Field of the Invention

This invention relates generally to a torsional vibration isolator or compensator, more particularly to a torsional compensator for a motorcycle primary drive, and specifically to a compensator which transmits torque from a hub member to a sprocket member through an elastomeric member.

2. Description of the Prior Art

Torsional vibration isolators known in the art include cam type, helical spring, friction plate, spider type with elastomeric cushion in compression, and various other elastomeric spring arrangements. A motorcycle engine compensator on the primary drive of a motorcycle can reduce the noise, vibration and harness (NVH) that would otherwise be transmitted from the engine to the rear wheel. The benefit of the compensator manifests especially at low engine speeds when transmission gear rattle noise may be caused by excessive engine torsional vibration. Representative of the art of motorcycle engine compensators are U.S. Pat. Nos. 7,143,734, and 6,688,986 and U.S. Pat. Pub. No. 2009/0005181A1. Other devices for vibration isolation representative of the broader art include the crankshaft gear isolator of U.S. Pat. No. 5,931,052, the decoupling vibration isolator of U.S. Pat. Pub. No. 2007/0209899A1, the motor isolator of U.S. Pat. No. 5,884,893, and the sewing machine isolator of U.S. Pat. No. 2,765,759.

SUMMARY

The present invention is directed to torsional compensator systems and methods which provide isolation of a drive from engine torsional vibrations and shocks.

The present invention is directed to a torsional compensator which can be mounted on a drive shaft and transmit power to a driven pulley via an endless belt, chain, gear train or other power transmission device, while preventing transmission of torsional vibrations between the drive shaft and the driven pulley.

An embodiment of the invention is directed to a torsional compensator having an inner hub, an outer sprocket, left and right grippers, and a resilient torsion sleeve, which are all generally coaxial. The left gripper is coupled to the inside of the outer sprocket near the left end of the outer sprocket, and the right gripper is coupled to the outside of the inner hub near the right end of the inner hub and axially spaced apart from the left gripper. The right gripper and the left end of the inner hub support the right end of the outer sprocket and the left gripper, respectively, for coaxial rotation thereon. The grippers, the inner hub, and the outer sprocket define a generally annular cavity there between, and the torsion sleeve is positioned within the cavity with its left end coupled to the left gripper and its right end coupled to the right gripper.

The compensator may also have one or more of a first sleeve bushing between the inner hub and the left gripper, and a second sleeve bushing between the outer sprocket and the right gripper. The sleeve bushings may be held in place by retainers, such as retaining rings or snap rings. The bushings may be of bronze, plastic, or other oil or self-lubricated material.

According to various embodiments of the invention, one or both of grippers may be integral with its respective outer sprocket or inner hub. There may also be a generally annular recess in at least one of the grippers, so that the respective end of the torsion sleeve may occupy the recess. One or both recess may have one or more grooves or protrusions or other profile for mechanical coupling, and each respective end of the torsion sleeve has features mating there with.

The compensator torsion sleeve may be elastomeric, for example, of rubber, thermoplastic elastomer, or polyurethane. The compensator may have at least one gate so that the elastomeric torsion sleeve may be formed in place within the cavity. The torsion sleeve may be adhesively bonded to the grippers. An annular space may separate the torsion sleeve from the inner hub, and/or from the outer sprocket.

According to various embodiments of the invention, the outer sprocket has an outer surface at least a portion of which is in the form of a drive sprocket for a toothed belt, a gear, a chain or the like. The outer sprocket may include a flange. One or more additional power transmission components may be mounted on the compensator, such as a gear ring, a one-way clutch, a chain sprocket, or an alternator rotor.

According to various embodiments of the invention, one or more lubrication holes may be provided in one or more or all of the hub, the sprocket, the grippers, and the sleeve for use in an oil lubricated drive, to provide oil flow to each bushing or each rotationally supported interface.

The invention is also directed to a system having a torsional compensator, a drive component, and a power train engaged for power transmission between said compensator and said drive component, wherein the compensator is an embodiment of the invention as already described. The system may include a toothed endless belt and a toothed belt pulley. The system may include one or more of a pulley, belt, chain, sprocket, tensioner, damper, and an isolator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
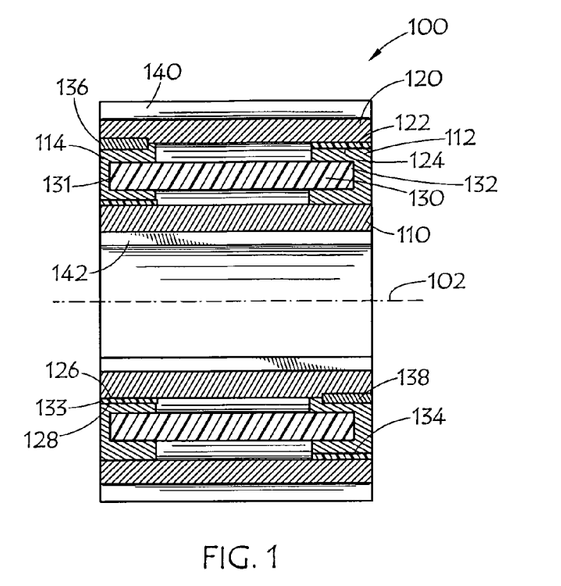
FIG. 1 is a cross sectional view of an embodiment of the invention.
Figure 2:
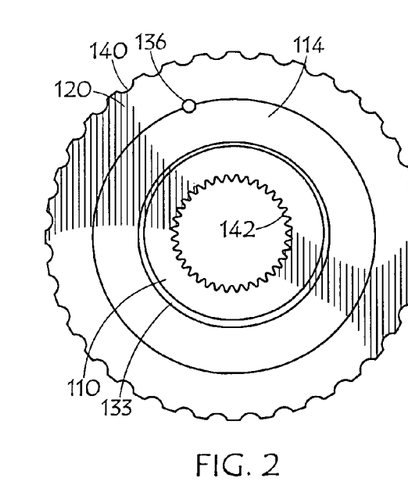
FIG. 2 is a left end view of the embodiment of FIG. 1.
Figure 3:
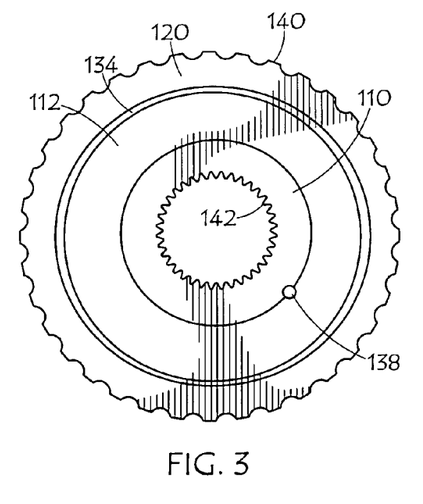
FIG. 3 is a right end view of the embodiment of FIG. 1.

FIGS. 1-3 show a first embodiment of the present invention. Compensator 100 has five primary components. Compensator 100 includes inner hub 110 which is generally in the form of a hollow cylinder whose inner surface 142 may be splined or otherwise adapted (e.g. with a keyway) for coupling to the drive shaft of the engine to which the compensator is to be applied and for fixed rotation therewith. Compensator 100 also includes outer sprocket ring 120 which is generally in the form of a hollow cylinder with at least a portion of its outer surface in the form of drive profile 140 for power transmission to a drive train. For example, drive profile 140 may be a toothed pulley as shown in FIGS. 1-3 for coupling with a toothed power transmission belt. Alternately, drive profile 140 may be in the form of a toothed sprocket or a gear for coupling with a chain drive or a gear train, respectively. Compensator 100 also includes two gripper members 112 and 114 of generally annular shape positioned in between and at opposite ends of hub 110 and sprocket ring 120 with axial space in between. One gripper member, right gripper 112 in FIG. 1, is coupled to the outer surface of hub 110 for rotation there with. The other gripper member, left gripper 114 is coupled to the inner surface of sprocket ring 120 for rotation therewith. The outer surface of right gripper 112 supports the right end of the inner surface of sprocket ring 120 on or near the right end of ring 120 for rotation of the sprocket ring about the hub. The inner surface of left gripper 114 is supported on or near the left end of the outer surface of hub 110 for rotation of the sprocket ring about the hub. Finally, the compensator 100 includes a torsional member in the form of torsion sleeve 130, a resilient elastomeric member in the general form of a hollow cylinder and positioned within the generally annular space defined between hub 110, sprocket ring 120, and two grippers 112 and 114. The left end of sleeve 130 is coupled to left gripper 114 for rigid rotation there with, and the right end of sleeve 130 is coupled to right gripper 112 for rigid rotation there with. Thus, hub 110, grippers 112 and 114, sleeve 130 and sprocket ring 120 are coaxial for rotation about axis 102. It should be understood that the designations "left" and "right" are used merely for easy reference to a part's location along the axis of rotation in the figures as shown. The parts could be reversed in a figure so that left and right are reversed without limiting the invention or significantly affecting the function thereof. The terms inner and outer refer to proximity to the axis (e.g. axis 102) of symmetry and rotation, i.e., inner is closer to the axis than outer, or alternately, for example in connection with a surface, to the orientation with respect to the axis of symmetry, i.e. inner is facing the axis and outer is facing away from the axis.

In addition to the five basic components described above, FIGS. 1-3 illustrate optional components which may be advantageous in various embodiments of the invention. FIG. 1 shows sleeve bushing 133 inserted between the inner surface 128 of left gripper 114 and the outer surface 126 of hub 110 for support, lubrication, and/or wear resistance. Likewise, sleeve bushing 134 is shown inserted between outer surface 124 of right gripper 112 and inner surface 122 of sprocket 120 for support, lubrication and/or wear resistance. Such bushings may advantageously prevent metal to metal contact which may create undesirable noise and excessive heat. Any suitable bushing may be used, including oil-impregnated bronze or sintered metal, self-lubricated polymers, or multi-layer composite bushings of steel, bronze, and lubricated plastic such as fluoro-polymer or fluoro-polymer-containing plastic, as non-limiting examples. For example, a bushing may be nylon, polyetheretherketone, ultra-high-molecular-weight polyethylene, polyacetal, polytetrafluoroethylene, including grades compounded with molybdenum disulfide, graphite, fluoropolymer or the like for self-lubrication, or other high-performance polymer. The compensator may be used self-lubricated or dry, or may instead run in oil or be part of a lubricated drive system. FIGS. 1-3 also show the grippers as press fit onto or into hub or sprocket, respectively, and the press fit or interference joints are shown reinforced with dowel pins 136 and 138, respectively. Alternately, the joint could be bonded, welded, cottered, splined, integrally formed, or the like in order to ensure proper coupling of each grippers to its respective hub or sprocket. Though not shown, a retainer of some kind could be used to prevent axial movement of the bushings. Instead of bushings, ball bearings or other some other type of bearing could be used.

The coupling of torsion sleeve 130 to grippers 112 and 114 may be effected by mechanical means or by chemical adhesion or both. For example, sleeve 130 may have splines or teeth or grooves that mate with splines or teeth or grooves on one or both grippers, and/or sleeve 130 may be bonded to the grippers. It may be desirable to reinforce the elastomeric torsion sleeve with jacket or fabric on the outside and/or on the inside for wear protection against the gripper.

In operation, hub 110 is coupled to and rotates with a drive shaft, such as a primary drive of a motorcycle engine. Since right gripper 112 is coupled for rotation with hub 110, it also rotates with the drive shaft. However, left gripper 114 and sprocket ring 120 are connected to the hub through resilient elastomeric sleeve member 130 and are otherwise free to rotate relative to the hub. Thus, the motion of the sprocket relative to the hub will depend on the load attached to the sprocket, the dynamics and torque output of the engine, and the torsional stiffness of the elastomeric sleeve. The elastomeric torsion sleeve may function both as torsional spring and as a torsional vibration damper. The sleeve may be formed of rubber, i.e., of vulcanized or crosslinked elastomer, or thermoplastic elastomer, or the like. In a preferred embodiment, the sleeve is of cast or injection molded polyurethane. The sleeve may be molded and optionally reinforced with fibers or textiles, internally or on a surface, and press fitted into the grippers, or bonded or attached with suitable fasteners. Alternately, the elastomer may be formed in place, by casting, injection molding, transfer molding, and the like, and/or vulcanization bonded for example in direct contact with one or both grippers. Forming in place allows the elastomer to readily conform to the desired sleeve shape including the shape of any recess or grooves or teeth or splines or the like present in the grippers for better mechanical adhesion. Specific examples and methods will be described later.

A compensator according to the present invention may be sized and designed for the needs of a particular application. By way of example, the following describes a design approach for a typical motorcycle primary drive compensator according to an embodiment of the invention. The typical target for the torsional stiffness, K, of a motorcycle engine compensator may be about 25 N-m/degree based on a typical maximum torsional deflection, $\theta$, of about 40° under a typical maximum torque, M, of about 1000 N-m. The desirable shear modulus, G, for the elastomer of the sleeve can be determined as follows:

$$G = M \cdot L/(\theta \cdot Ip)$$

where L is the effective length of the sleeve, and where the second polar moment of inertia, Ip, may be calculated as follows:

$$Ip = (\pi/32) \cdot (OD^4 - ID^4).$$

For example, for a sleeve with outside diameter, OD=90 mm, and inside diameter, ID=60 mm, Ip is 5168901 mm$^4$. For a sleeve effective length of 30 mm, and the other parameters as indicated above, the shear modulus G should be about 8 MPa. The elastomer Young's modulus, E, can be expressed in term of shear modulus as $E = 2 \cdot (1+v) \cdot G$, where Poisson's ratio, v, is generally 0.5 for rubber (incompressible) materials, so that E=3G, resulting in E of about 24 MPa for the example parameters indicated above. This modulus is in the achievable range with proper elastomer compounding or formulation techniques. Furthermore, the shear stress, $\tau$, may be estimated as follows:

$$\tau = 16 \cdot M/[\tau \cdot OD^3 (1 - ID^4/OD^4)]$$

Under a typical motorcycle engine maximum torque, M=1000 N-m, and with the example dimensions given above, the maximum shear stress, $\tau$=9 MPa. This maximum shear stress is in a reasonable stress range for elastomers including cast polyurethane material.

It may be noted that the elastomeric torsion sleeve is preferably in the general form of a short rubber tube with an effective length defined as the length which is free to twist under torque from the grippers, approximately equal to the axial distance between the grippers but not including portions of the sleeve which might be contained within a groove or recess of the gripper. For typical vibration isolation applications, the torsional stiffness of the sleeve may preferably be relatively low in order to maximize the isolation effect. Low stiffness may be facilitated for example by increasing the effective length of the sleeve, decreasing the sleeve thickness, increasing the ratio of sleeve length to sleeve diameter, or the like. It may be advantageous, for example to make the sleeve effective length at least about the same as the sleeve nominal radius, or in the range of 0.5 to 2 times the nominal radius. If the effective length is too small, for example in the range of the sleeve radial thickness or less, the torsional stiffness may be too great for effective vibration isolation. It should be noted that left and right grippers are axially spaced apart to accommodate the axial effective length of the torsion sleeve.

Figure 4:
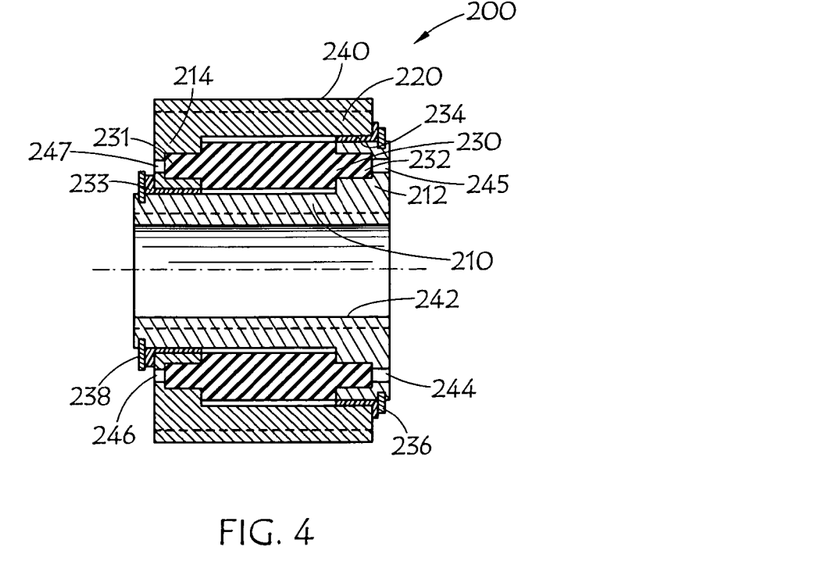
FIG. 4 is a cross sectional view of a second embodiment of the invention.

FIG. 4 shows a cross section of a second embodiment of the invention in the form of compensator 200 having three primary components: inner hub 210, outer tooth sprocket 220, and torsion sleeve 230. Outer tooth sprocket 220 has profiled outer surface 240 and includes integrally formed left gripper 214 on its inner surface. Inner hub 210 has a splined inner surface 242 for coupling to a drive shaft and includes integrally formed right gripper 212 on its outer surface. The outer surface of right gripper 212 supports the right end of the inner surface of sprocket ring 220 at or near the right end of sprocket ring 220 for rotation of the sprocket ring about the hub. The inner surface of left gripper 214 is supported on or near the left end of the outer surface of hub 210 for rotation of the sprocket ring about the hub. Finally, the compensator 200 includes torsion sleeve 230, a resilient elastomeric member in the general form of a hollow cylinder and positioned within the compensator cavity, i.e., the generally annular space defined between hub 210, sprocket ring 220, and two grippers 212 and 214. Left end 231 of sleeve 230 is coupled to left gripper 214 for rigid rotation there with, and right end 232 of sleeve 230 is coupled to right gripper 212 for rigid rotation there with.

In addition to the three main components described above, FIG. 4 illustrates optional components which may be advantageous in various embodiments of the invention. FIG. 4 shows sleeve bushing 233 inserted between the inner surface of left gripper 214 and the outer surface of hub 210 for support, lubrication, and/or wear resistance. Likewise, sleeve bushing 234 is shown inserted between the outer surface of right gripper 212 and the inner surface of sprocket 220 for support, lubrication and/or wear resistance. Retainers in the form of two snap rings 236 and 238 are shown in FIG. 4 being employed to anchor the corresponding sleeve bushings and/or to constrain the axial movement of the outer sprocket ring relative to the inner hub. The snap rings may be fit into appropriate grooves near the ends of the outer surfaces of the hub as shown (but not numbered). By "near" is meant as near the ends as practical for proper use of retainers such as snap rings, in order to minimize the dimensions of the compensator or the amount of metal used therein.

In an embodiment of the invention, the torsion sleeve may be an elastomeric member, for example, a cast polyurethane tube. In embodiments of the invention, the outer sprocket and inner hub pieces, which may be of metal, may also serve as the mold. During the molding process, two insert sliders or sleeves may be inserted in place of the two sleeve bushings. These insert sliders may extend the full length of the cavity defined by the hub and sprocket and between the two grippers. Thus, the polyurethane or other elastomeric material introduced to form the torsion sleeve may be kept away from the hub and sprocket surfaces and only come into contact with the gripper surfaces where coupling is desired. Injecting and/or venting gates may be incorporated as needed. In FIG. 4, a number of gates 244, 245, 246, and 247 are shown located on both ends of left and right integral grippers 212 and 214. Cast urethane or other injected elastomer may fill the gates, and thus the gates may serve as a coupling or mechanical locking mechanism between the torsion sleeve and the rigid gripper parts which are typically of metal. After injecting the resilient material, and curing or vulcanizing or cooling as appropriate, the inserted sliders may be pulled out and the bushings may be inserted. Thus, the torsion sleeve may be formed within the compensator cavity while avoiding frictional interference between the sleeve and the hub or sprocket.

The coupling of the torsion sleeve to the grippers may be facilitated by use of adhesive. A suitable adhesive may be applied to the gripper surfaces before injecting or casting according the aforementioned process. Thus, the torsion sleeve may be simultaneously formed and/or vulcanized and bonded to the grippers. Alternately, the torsion sleeve may be separately formed and then assembled with adhesive into the compensator cavity. The grippers shown in FIGS. 1-4 have a groove or recess of generally annular shape which advantageously increases the surface area for bonding to the sleeve, thus increasing the durability of the compensator. The combination of grooved grippers, adhesive and gates, with cast polyurethane for the sleeve, makes for a durable and useful compensator.

Figure 5:
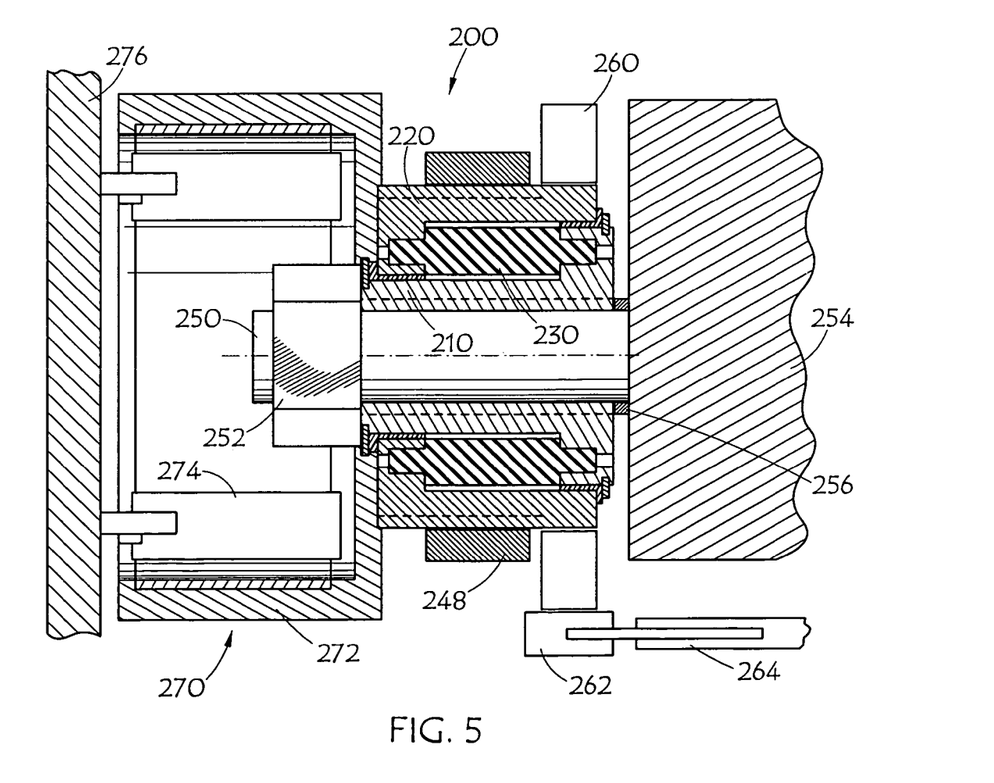
FIG. 5 is a cross sectional view of a third embodiment of the invention based on the embodiment of FIG. 4.

While a compensator according to an embodiment of the invention may simply drive a power transmission belt or chain, in other embodiments, other components or functions may be envisioned. One such possible implementation of a compensator on a motorcycle engine is illustrated in FIG. 5. In FIG. 5, compensator 200 is mounted on drive shaft 250 adjacent to engine block 254 and held there by nut 252 and shaft shoulder 256. Toothed belt 248 is trained around sprocket ring 220 for driving a transmission input shaft (not shown). Gear ring 260 can be pressed on to compensator sprocket 220 for engaging with starter gear 262 which is driven by starter motor 264. Also, alternator rotor 272 having permanent magnets can be attached or bolted onto sprocket ring 220, and stator 274 of alternator 270 can be attached or bolted onto engine cover 276. Rotor 272 and gear ring 260 can also serve as flanges to prevent toothed belt 248 from tracking too far in the axial direction. Thus, the compensator can isolate crankshaft vibrations from the alternator and/or the starter system in addition to the primary drive system.

Figure 6:
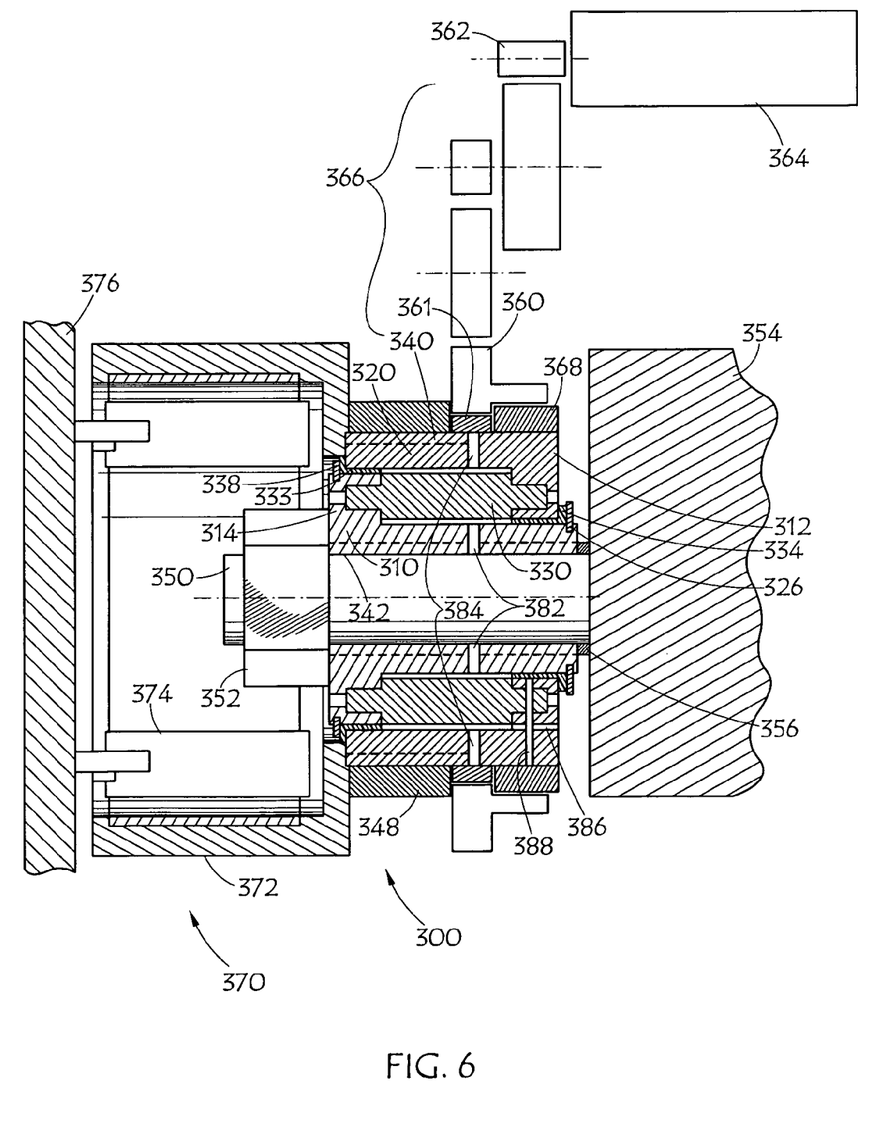
FIG. 6 is a cross sectional view of a fourth embodiment of the invention.

Another possible implementation of a compensator on a motorcycle engine according to an embodiment of the invention is illustrated in FIG. 6. In FIG. 6, compensator 300 is mounted on drive shaft 350 adjacent to engine block 354 and held there by nut 352 and shaft shoulder 356. compensator 300 includes: hub 310 with inner splines 342 and integral left gripper 314; sprocket ring 320 with toothed profile 340 on a portion of the outer surface and integral right gripper 312; torsion sleeve 330 coupled with the grippers; with the sprocket ring supported on the hub by sleeve bushings 333 and 334 which are held in place by snap rings 326 and 338. Toothed belt 348 is trained around sprocket ring 320 for driving a transmission input shaft (not shown). Gear ring 360 is rotatably mounted onto compensator sprocket 320 with sleeve bushing 361 pressed in there between. Gear ring 360 has an integral lip on the right side. One way clutch 368 is positioned between compensator outer sprocket 320 and the gear ring's lip. One way clutch 368 is adapted to engage gear ring 360 when it is desired for the gear ring to rotate with drive shaft 350, e.g., when starting the motorcycle engine. Starter gear 362, which is driven by starter motor 364, is operationally coupled to ring gear 360 by starter gear train 366. As in the previous embodiment, alternator 370 may be incorporated with the compensator. Alternator rotor 372 having permanent magnets can be attached or bolted onto sprocket ring 320, and stator 374 of alternator 370 can be attached or bolted onto engine cover 376. Rotor 372 and gear ring 360 can also serve as flanges to prevent toothed belt 348 from tracking too far in the axial direction. Thus, the compensator can isolate crankshaft vibrations from the alternator and/or the starter system in addition to the primary drive system. It should be noted that compensator 300 is mounted on shaft 350 with the gripper of sprocket ring 320 on the right or closest to the engine block, and that this is opposite the orientation of compensator 200 of FIG. 5. Thus, various orientations or coupling arrangements are envisioned in the scope of the invention. To start the engine, the starter motor will engage the engine crankshaft via the one way clutch. When the engine is running, the one way clutch inner race way will slip to prevent the movement of the starter motor.

The embodiment of FIG. 6 also illustrates how oil lubrication can be provided to various slipping surfaces to prevent seizing and over heating during regular engine operation. With oil lubrication, bushings 333, 334, and 361 are preferably bronze bushings. One or more radial holes 382 may be introduced in compensator inner hub 310 and holes 382 may align with oil holes (not shown) in the engine crankshaft. One or more open axial channels (not shown) may be cut in the inner bronze bushing 334 and one or more axial channels 386 may be cut in the right inside corner of the outer sprocket as shown in FIG. 6. Channels 386 in the outer sprocket may be joined to axial channels in the inner bronze bushing by radial holes 388 which continue on through the sprocket to supply oil to one way clutch 368. Finally, one or more radial holes 384 through outer sprocket 320 may provide oil access underneath bronze bushing 361 at gear ring 360. Such an oil channel arrangement is illustrated in the lower half of compensator 300 in FIG. 6. It may be advantageous to provide two sets of channels opposite each other, or more sets of channels may be provided, or other channel arrangements may be provided within the scope of the invention.

Figure 7:
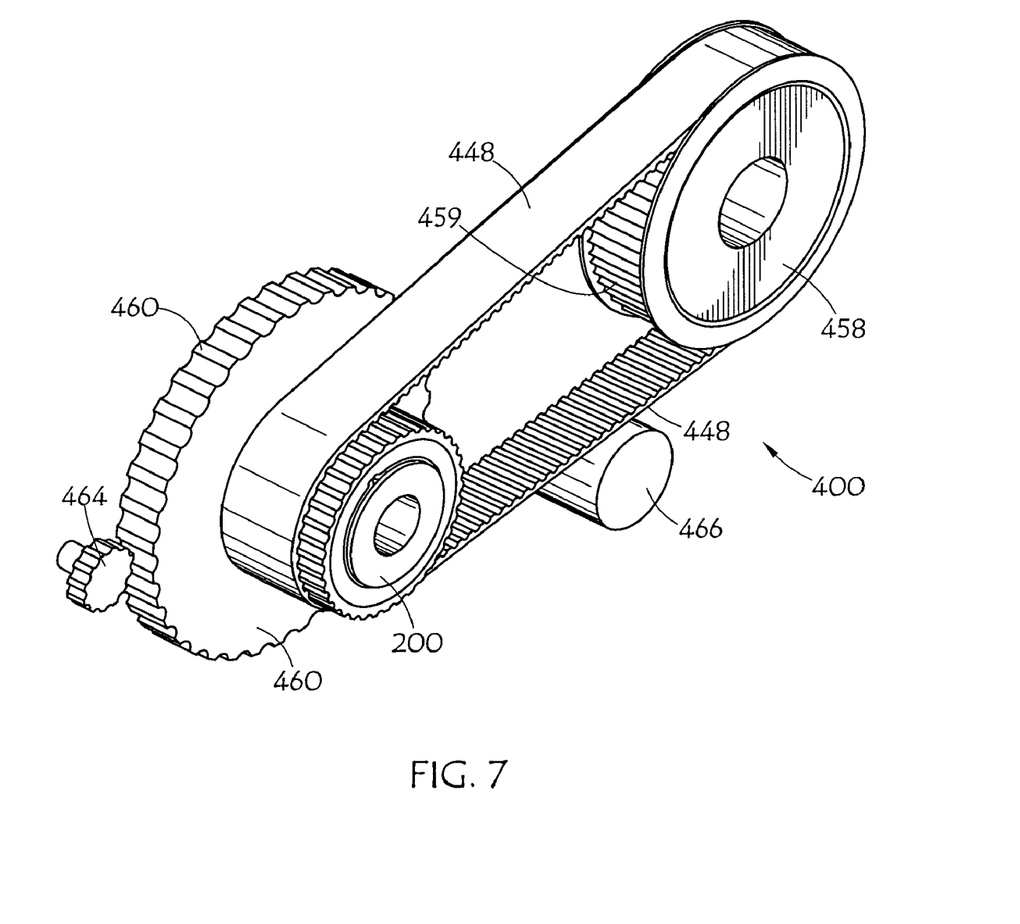
FIG. 7 is a perspective view of a system embodiment of the invention.

FIG. 7 illustrates a drive system according to an embodiment of the invention. In FIG. 7, compensator 200 is mounted to rotate with a primary drive shaft of an engine, such as a motorcycle engine (not shown). Starter 464 can engage starter gear 460 which is coupled to compensator 200 for rotating the primary drive shaft for starting the engine. Toothed belt 448 is trained about compensator 200 and driven sprocket 458 with toothed profile 459. The driven sprocket may be, for example, a clutch sprocket for a motorcycle transmission. Other potential system components may be contemplated according to embodiments of the invention, including one or more idler pulley, tensioner, isolator or damper pulley, alternator, generator, chain drive and chain, gear train, and various driven devices.

Figure 8:
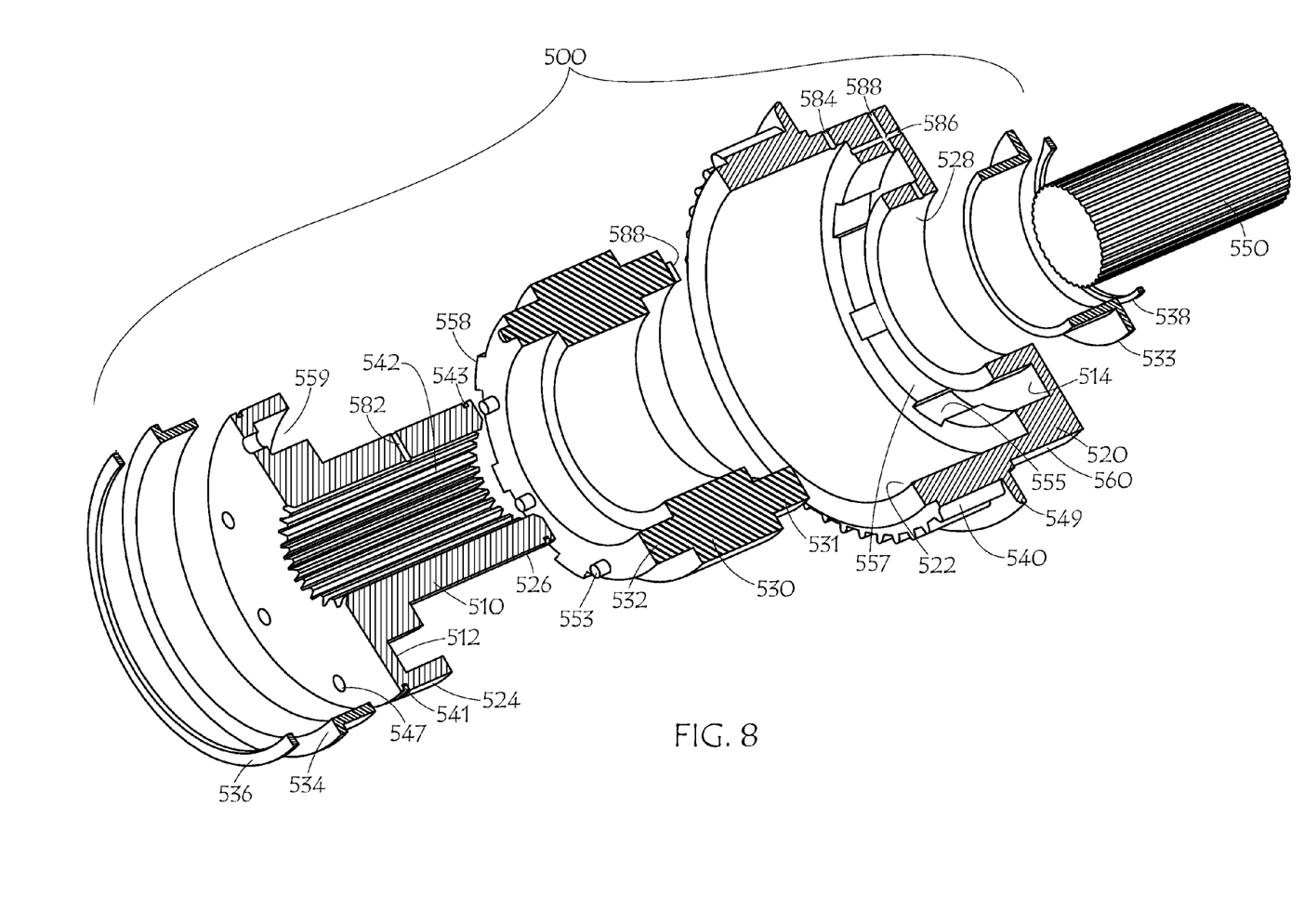
FIG. 8 is an exploded, partially fragmented, perspective view of a fifth embodiment of the invention.

FIG. 8 shows an exploded view of a compensator according to another embodiment of the invention. In FIG. 8 compensator assembly 500 includes: inner hub 510 with inner splines 542 for coupling to drive shaft 550 for rotation therewith and with integral left gripper 512; outer sprocket ring 520 with toothed profile 540 on a portion of its outer surface and with integral right gripper 514; torsion sleeve 530 with left end 532 and right end 531 adapted for coupling with the respective grippers. The outer sprocket ring is supported on the hub by sleeve bushings 533 and 534 which are held in place by snap rings 538 and 536, respectively. Sleeve bushing 533 is inserted between the inner surface 528 of right gripper 514 and the outer surface 526 of hub 510, and sleeve bushing 534 is inserted between outer surface 524 of left gripper 512 and inner surface 522 of sprocket 520 for support, lubrication and/or wear resistance. Grooves 541 and 543 are provided for the snap rings. Toothed belt profile 540 only extends axially about half the length of the compensator and is bounded by flange 549 to keep a belt from tracking off the profile. The remainder of the sprocket ring is a cylindrical surface portion 560 which can be used for accessories such as a starter gear or one way clutch as described above in connection with FIGS. 5 and 6. FIG. 8 illustrates a molded-in-place torsion sleeve 530 which has nubs 553 on the ends from material formed within gates 547.

Grippers 512 and 514 include annular recesses 559 and 557, respectively, with grooves 555 therein for mechanical gripping or coupling to sleeve ends 531 and 532. Thus, sleeve 530 has complementary teeth 558 formed on sleeve ends 531 and 532. Teeth 558 provide mechanical coupling between sleeve and gripper, and it should be understood that other tooth shapes, and any desired number thereof, are possible within the scope of the invention. For example, rectangular or trapezoidal, curvilinear or wavy, wedge or dovetail tooth shapes are possible. Thus, in various embodiments of the invention, each recess in a gripper may have one or more grooves or protrusions of various shapes, and each respective end of the torsion sleeve has complementary features for mating there with for mechanical coupling in addition to any chemical adhesion provided.

FIG. 8 also illustrates how oil channels may be used to provide lubrication to the various bushings. The oil channels are similar in location and purpose to those described in connection with the embodiment of FIG. 6. Oil channels 582, 584, 586, and 588 are shown in FIG. 8. Radial hole 582 through inner hub 310 may align with oil holes (not shown) in the engine crankshaft. One or more open axial channels (not shown) may be cut in inner bushing 533. Axial channel 586 may be cut near the right inside corner of the outer sprocket. Axial channels 586 and channels in bushing 533 may be joined by radial hole 588 which continue on through outer sprocket 520 and may also pass through torsion sleeve 530 if necessary. Finally, one or more radial holes 584 through outer sprocket 520 may also be provided. Other suitable oil channel or hole arrangements may be envisioned within the scope of the invention.

The torsional compensator of the present invention has a number of advantages. It is a very simple design with very few component parts, so should be economical to manufacture and assembly. Particularly notable is that the present compensator does not require or utilize conventional metal springs, or cam and ramp devices, or the like. The present compensator also has few moving parts, and those moving parts can utilize sleeve bushings or other common bearing components for a very durable assembly. A third advantage is that the torsion sleeve can be the weak link in a drive system, so that excessive torque conditions fail the elastomer instead of a more expensive component such as a drive shaft. The present compensator may advantageously not incorporate a stop to limit torsional motion to a maximum angle of twist. Such a stop could be incorporated in order to provide positive "fail-safe" drive capability in the event of failure of the torsion sleeve, but such a stop could also result in damage to other drive or engine components due to excessive torque.

The torsional compensator of the present invention can be usefully applied to motorcycle drive systems on the primary drive shaft as described herein, or on a secondary drive shaft or on a rear wheel. Likewise the torsional compensator of the present invention can be usefully applied to power transmission systems other than motorcycles. As non-limiting examples, the inventive compensator could be used on drive trains or systems for micro-cars, all terrain vehicles, golf carts, snowmobiles, lawn mowers, outboard motors, personal water craft, or the like. The torsional compensator of the present invention can be usefully applied to industrial power transmission systems having high torsional shocks or vibrations, such as pumps drives, robotics, drilling rigs, fan drives, or the like.

An example compensator was constructed according to the embodiment of FIG. 8. Cast polyurethane was introduced through gates 547 with temporary sleeve inserts as described above in connection with the embodiment of FIG. 4. The dimensions of the compensator were approximately as described in the example mentioned in the design calculations above. The gripper recesses were coated with an appropriate rubber-metal adhesive sold under the trademark Chemlok 213 by the Lord Corporation. The resulting compensator exhibited a torque-deflection curve with an initial slope of approximately 25 N-m/degree, softening to a slope of about 9 to 15 N-m/degree over the range of 5 to 40°, and ultimately failing by elastomer tear in the torsion sleeve at an angle of about 85° and a torque of about 720 N-m.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A torsional compensator comprising an inner hub, an outer sprocket, left and right grippers, and a resilient torsion sleeve;
    with the left gripper coupled to the inside of the outer sprocket near the left end of the outer sprocket and the right gripper coupled to the outside of the inner hub near the right end of the inner hub and axially spaced apart from the left gripper;
    with the right gripper and the left end of the inner hub supporting the right end of the outer sprocket and the left gripper respectively for coaxial rotation thereon, and with the grippers, the inner hub, and the outer sprocket defining a generally annular cavity there between; and
    with said torsion sleeve positioned within said cavity with a left end coupled to the left gripper and a right end coupled to the right gripper.

2. The compensator of claim 1 further comprising a first sleeve bushing between said inner hub and said left gripper, and a second sleeve bushing between said outer sprocket and said right gripper.

3. The compensator of claim 2 wherein said sleeve bushings are held in place by retainers.

4. The compensator of claim 3 wherein said retainers are snap rings.

5. The compensator of claim 1 wherein said left gripper is integral with said outer sprocket, and said right gripper is integral with said inner hub.

6. The compensator of claim 1 further comprising a generally annular recess in at least one of said left and right grippers, said recess occupied by an end of said torsion sleeve.

7. The compensator of claim 6 wherein each said recess has one or more grooves or protrusions and each respective end of said torsion sleeve has complementary features mating there with.

8. The compensator of claim 1 wherein said inner hub, outer sprocket, left and right grippers, and torsion sleeve are coaxial.

9. The compensator of claim 1 wherein said torsion sleeve is formed of polyurethane.

10. The compensator of claim 9 wherein said compensator has at least one gate, and said polyurethane is formed in place within said cavity, and said torsion sleeve is adhesively bonded to said grippers.

11. The compensator of claim 10 wherein a first annular space separates said torsion sleeve from said inner hub, and a second annular space separates said torsion sleeve from said outer sprocket.

12. The compensator of claim 1 wherein said outer sprocket has an outer surface at least a portion of which is in the form of a toothed belt drive sprocket.

13. The compensator of claim 12 having a flange adjacent the portion which is in the form of a toothed belt drive sprocket.

14. The compensator of claim 12 further comprising at least one additional power transmission component selected from a gear ring, a one-way clutch, a chain sprocket, and an alternator rotor.

15. The compensator of claim 1 wherein said outer sprocket has an outer surface at least a portion of which is in the form of a chain drive sprocket.

16. The compensator of claim 1 wherein said outer sprocket has an outer surface at least a portion of which is in the form of a gear drive.

17. The compensator of claim 1 having lubrication hole provided in at least one of the hub, the sprocket, the grippers, and the sleeve.

18. The compensator of claim 1 having a plurality of lubrication holes provided in one or more of the hub, the sprocket, the grippers, and the sleeve.

19. The compensator of claim 1 wherein said torsion sleeve comprises an effective length that is free to twist between said left and right grippers, said effective length approximately equal to the axial distance between said grippers.

20. A system comprising a torsional compensator, a drive component, and a power train engaged for power transmission between said compensator and said drive component;
    said torsional compensator comprising an inner hub, an outer sprocket, left and right grippers, and a resilient torsion sleeve;
    with the left gripper coupled to the inside of the outer sprocket near the left end of the outer sprocket and the right gripper coupled to the outside of the inner hub near the right end of the inner hub and axially spaced apart from the left gripper;
    with the right gripper and the left end of the inner hub supporting the right end of the outer sprocket and the left gripper respectively for coaxial rotation thereon, and with the grippers, the inner hub, and the outer sprocket defining a generally annular cavity there between; and
    with said torsion sleeve positioned within said cavity with a left end coupled to the left gripper and a right end coupled to the right gripper.

21. The system of claim 20 wherein said drive train includes a toothed endless belt, and said drive component includes a toothed belt pulley.

22. The system of claim 20 comprising one or more selected from a pulley, belt, chain, sprocket, tensioner, damper, and an isolator.

23. A torsional compensator comprising an inner hub, an outer sprocket, left and right grippers, and a resilient torsion sleeve;
    with the left gripper integrally formed on the inside of the outer sprocket near the left end of the outer sprocket, and the right gripper integrally formed on the outside of the inner hub near the right end of the inner hub;
    with the inner hub supporting the outer sprocket for coaxial rotation thereon, and with the inner hub and the outer sprocket defining a generally annular cavity there between; and
    with said torsion sleeve positioned within said cavity with a left end coupled to the left gripper and a right end coupled to the right gripper.

24. The compensator of claim 23 further comprising a first sleeve bushing between said inner hub and said left gripper, and a second sleeve bushing between said outer sprocket and said right gripper.

25. The compensator of claim 24 wherein said sleeve bushings are held in place by retaining rings.

26. The compensator of claim 23 wherein said torsion sleeve comprises an effective length that is free to twist between said left and right grippers, said effective length approximately equal to the axial distance between said grippers.

* * * * *